(No Model.)
O. B. SHALLENBERGER.
COUPLING OF ALTERNATE ELECTRIC CURRENT GENERATORS.
No. 383,662. Patented May 29, 1888.
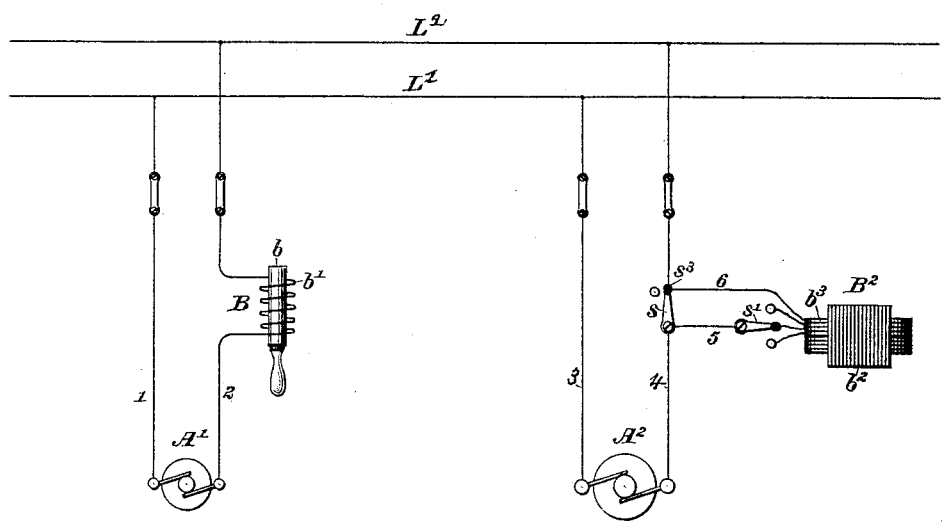
Witnesses,
Geo. W. Breck.
Eugene J. Reilly
Inventor,
O. B. Shallenberger
By his Attorneys
Pope Edgecomb & Terry.

United States Patent Office.

OLIVER B. SHALLENBERGER, OF ROCHESTER, ASSIGNOR TO THE WESTING-HOUSE ELECTRIC COMPANY, OF PITTSBURG, PENNSYLVANIA.

COUPLING OF ALTERNATE-ELECTRIC-CURRENT GENERATORS.

SPECIFICATION forming part of Letters Patent No. 383,662, dated May 29, 1888.

Application filed September 1, 1887. Serial No. 248,464. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Systems of Circuits for Electric Generators, of which the following is a specification.

The invention relates to an organization of circuits and apparatus whereby electric generators of different degrees of self-induction may be coupled in multiple arc with any given circuit, and each generator caused to perform its proportionate amount of work.

In practice it is found that two alternate-current electric generators when connected in multiple arc with each other are liable to have different capacities for self-induction, especially is this so when one machine is of greater size than the other. Nevertheless, under certain circumstances it is frequently found desirable to connect such machines in this manner.

The present invention is designed to provide means whereby two machines so connected may be caused to perform each its proportionate amount of work; and it consists in providing a self-induction or reactive coil, which is preferably adjustable for the machine, which is liable to have less self-induction than the other.

In the accompanying drawing there is shown in diagram an organization of circuits adapted to carry out the invention.

Referring to the figure, A' and A² represent two alternate-current electric generators. The machine A' is here shown as being smaller than the machine A². It has its respective poles connected by conductors 1 and 2 with the main line L' and L². Likewise the machine A² has its poles connected by conductors 3 and 4 with the main line L' L². In the conductor 2, for instance, there is inserted an adjustable self-induction device, B, consisting of a core, $b$, movable into and out of a coil, $b'$. The alternating current traversing the conductor will act upon this core, and the core in turn will act upon the conductor in such manner as to create a counter electro motive force in the conductor, and this may be regulated so that the machine A' will perform its proportion of work with reference to the machine A². In some instances other forms of self-induction devices may be employed, as shown, for instance, in connection with the machine A². Here the device B² consists of an electric converter composed of a core, $b^2$, of soft-iron sheets or plates insulated from each other and provided with a coil, $b^3$, different lengths of which may be connected in circuit. For this purpose the connections of the conductor 3 are through a switch, $s$, which is here shown as being closed. The switch is connected by a conductor, 5, with a switch, $s'$, capable of being moved into connection with different points in the length of the coil $b^3$, and one terminal of the coil $b^3$ is connected by a conductor, 6, with the switch-point $s^3$ of the switch $s$.

I claim as my invention—

1. The combination of two dynamo-electric generators whose armatures have different amounts of self-induction, a circuit to which they are connected in multiple arc, and a device connected in series with one of the machines having a self-induction approximately equal to the difference of the self-inductions of the armatures.

2. The combination, with two alternate-current electric generators of different capacities for self-induction, of a main line with which they are connected in multiple arc, and an adjustable self-induction device connected in series with one of the machines, substantially as described.

In testimony whereof I have hereunto subscribed my name this 4th day of August, A. D. 1887.

OLIVER B. SHALLENBERGER.

Witnesses:
W. D. UPTEGRAFF,
L. B. STILLWELL.